BEST AVAILABLE COPY
BEST AVAILABLE COPY
E. B. FORBUSH.
Harvester.
No. 693. Reissued Apr. 19, 1859.
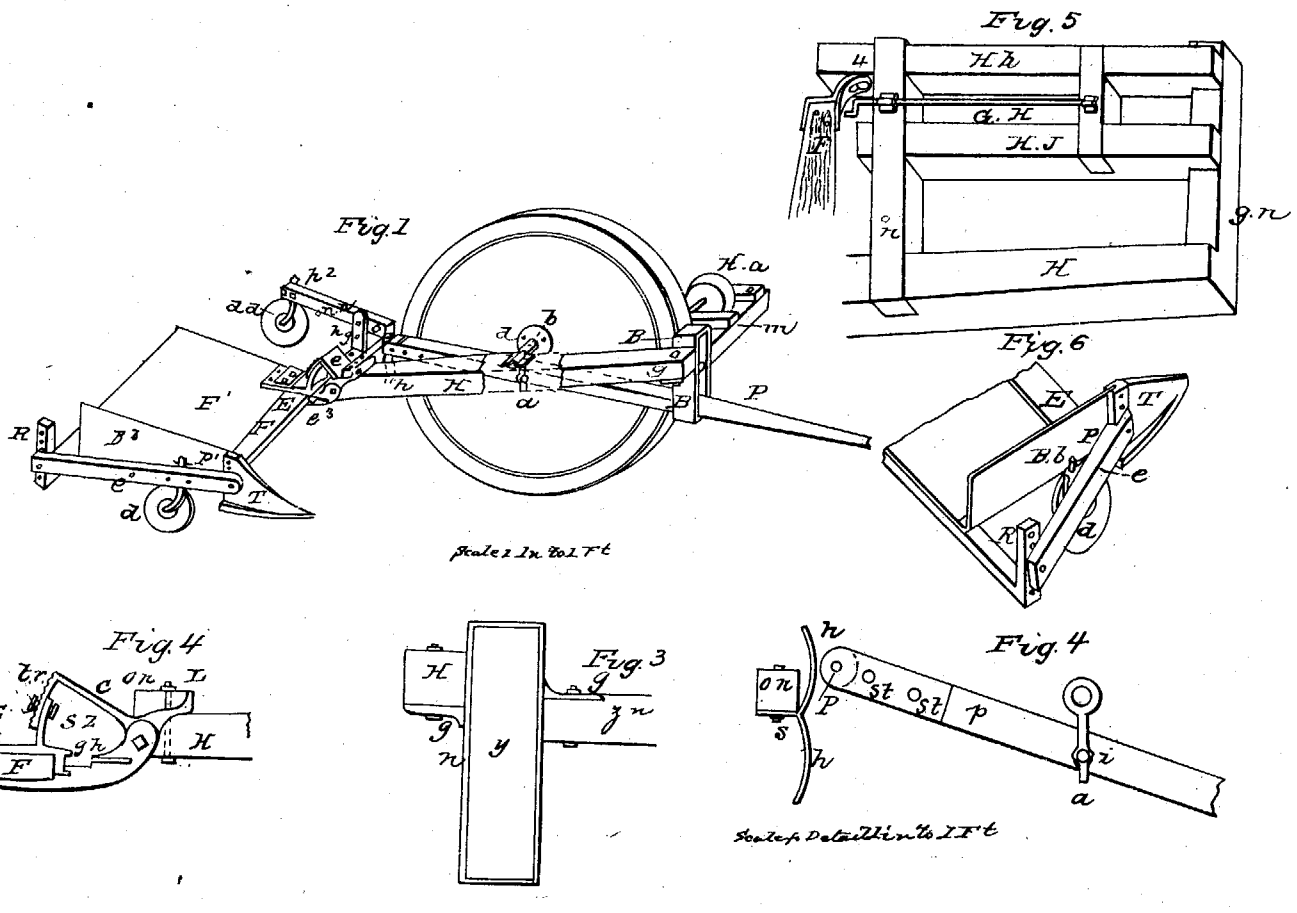
Witnesses
George Warkworth
Walter R. Forbush.
Inventor
Ebenezer B. Forbush
N. PETERS, Photo-Lithographer, Washington, D. C.

UNITED STATES PATENT OFFICE.

ELIAKIM B. FORBUSH, OF BUFFALO, NEW YORK.

IMPROVEMENT IN GRAIN AND GRASS HARVESTERS.

Specification forming part of Letters Patent No. 14,448, dated March 18, 1856; Reissue No. 693, dated April 19, 1859.

*To all whom it may concern:*

Be it known that I, ELIAKIM B. FORBUSH, of the city of Buffalo, in the county of Erie and State of New York, have invented new and useful Improvements in Reaping and Mowing Machines, and I do hereby declare that the following is a full and exact description thereof, reference being had to the accompanying drawings, and to the figures and letters of reference marked thereon.

The nature of my invention consists, first, in an improved main frame; second, in combining a guide-stirrup with the main frame, as will be hereinafter described; third, in certain improvements in the mode of connecting and operating the draft-pole; fourth, in certain improvements in the mode of connecting the finger-bar to the main frame and of adjusting it in relation thereto; fifth, in an improved adjusting-shoe; sixth, in the arrangement of caster-wheels in a manner which will be more fully set forth hereinafter.

Other features of my invention will also be set forth and described hereinafter in connection with the above.

To enable others skilled in the art to make and use my invention, I will proceed to describe its construction and operation.

The main frame is constructed with the rear end of the inner timber depressed or dropped below the other parts of the frame where the shoe is attached, in order to serve as a continuation of the shoe, strengthen the connection, and admit the cutting apparatus to work near the ground.

I also make a metallic journal-box or oscillating pendant to work upon the axle of the driving-wheel, and to which the draft-pole (or tongue) is attached. This journal-box should be about three inches in diameter and about six inches in its cylindrical length. Its bore is about two inches in diameter and slips onto the axle of the driving-wheel and allows the axle to turn freely and smoothly within it. This journal-box is represented in its place on the axle of the driving-wheel at *a b*, Figure 1. It has two arms dropping down about six inches and leaving a space of four inches between them to receive the draft-pole. An end view of the journal-box and arm is given in Fig. 4, (*a b*, journal-box; *a*, arm.)

The pole P is placed between the arm *a* and its opposite arm, the bolt *i* passing through the arms and pole and allowing the pole to swing on the bolt. The arms are four inches apart. The pole also extends back sufficiently far to meet the rear cross-timber of the frame or the bumper *h h*, which is bolted to the cross-timber *o n*, as represented at *s*, Fig. 4.

The main body of the bumper which comes in contact with the timber is four by three and a half inches, and half an inch thick. Its two arms are four inches wide on their face and half an inch thick. They are about six inches long, and branch off from their main body in opposite directions, and are circular in form, as represented at *h h*, Fig. 4. On the end of the pole is a roller two and a half inches in diameter and three and three-quarter inches in length, and is marked *r* in Fig. 1 and *h r* in Fig. 4, and is connected with the pole by means of straps bolted to the pole, (represented at *s t*, *s t*, Fig. 4.)

When it is required to back the machine the horses press backward in the harness, the pole swings upon the journal-box, the end of the pole (or the roller *r*) strikes against the bumper, so that the whole backing-power of the team is exerted upon the bumper, and through it upon the frame of the machine in rear of the driving-wheel and below the axle, and the machine thereby moved back with much greater ease. When the team moves forward the pole swings forward, so as to bring the draft through the journal-box directly from the axle. Thus when backing the point of draft is from the frame in rear of the driving-wheel and below the axle, and when moving forward it is directly from the axle.

When the draft-pole is attached in the common way permanently to the frame, or by a hinge on the frame in front of the axle of the driving-wheel, the power exerted by the team in backing has a tendency to press the driving-wheel and finger-bar closely to the ground, causing more resistance than the weight of the machine.

With the arrangement of the draft-pole as herein described the power of the team has a lifting tendency on the driving-wheel and finger-bar when backing, and the machine is thereby moved back with much greater ease and facility. With this arrangement, also, the frame is left free to balance upon the axle of the driving-wheel and the cutter-bar and cutters at liberty to follow the surface of the ground over which the machine passes without being affected by the tread of the driving-wheel, the pole, or the draft of the team.

I make a guide-stirrup of cast-iron and connect with the frame in front. It has a flange or short arm upon either side, through which it is bolted to the frame, as represented at *g g*, Figs. 1 and 3. This stirrup is represented at B B, Figs. 1 and 3. It is about four inches wide, nineteen inches in height, and about five and a half inches in breadth across its upper and lower ends, and has a space through which the draft-pole passes of four by eighteen inches, as seen at *y* in Figs. 1 and 3. This allows the pole to move up and down in the stirrup, while it fills the space sidewise, so as to guide the direction of the machine and permit the frame to vibrate and balance on the axle, and also the finger-bar and cutters to conform to the uneven surface of the ground without being affected by the pole or the draft of the team. This arrangement also relieves the horses' necks from undue pressure—such as is occasioned by the oscillations of the machine—when the draft-pole is attached permanently to the frame. The stirrup extends above and below the front end of the frame, so as to allow the frame to balance its proper distance either way.

I make an adjustable or jointed shoe for the purpose of connecting the finger-bar and cutters to the frame and for holding the same in a horizontal or slanting position, at whatever height it may be required to work the cutters for grass or grain. This adjustable shoe, as combined and put together, is referred to by the letter E, and represented by Fig. 2. When the finger-bar and cutters are attached to the frame in rear of the driving-wheel and raised and depressed by the frame in turning upon the axle of the driving-wheel as a center, the cutters and the platform are brought into a slanting position, so much so as to make it impracticable to work the machine without some arrangement by which the cutters and the platform may be placed in a horizontal position at any height it may be desired to work the cutters. This adjustable shoe is intended to remedy this difficulty. It is made in three parts, the upper or bonnet part, (marked *c* in Fig. 2,) the shoe or runner part, (marked *e z*,) and the middle or compressing part, (marked *e e c*.) The upper or bonnet part is about five inches wide, and so constructed that it may be bolted to the side timber, H, of the frame with two or more bolts, so as to hold it firmly to the frame. These bolts pass through the cross-timber *o n*, the side timber, H, and the bonnet, one of which bolts is shown at L, Fig. 2. It might properly be made longer, so as to receive another bolt through the timber H. It is made so as to form a joint or hinge with the under or runner part, as seen at L *n*, Fig. 2. It extends about twelve inches from this joint on an angle upward of about thirty-five degrees, (more or less,) and then drops down about eight inches, (more or less,) as represented at *t r*. The under or runner part, *e z*, is about five inches wide on the bottom, and connects with and forms a joint or hinge with the upper part, as shown at L *n*, Fig. 2. The middle or compressing part, *e e c*, locks into the runner, as shown at V. A bolt passes through these two parts behind the finger-bar, as seen at X. An arm, *s z*, about five inches wide, rises from this to the height of about eight inches to connect with the arm *t r* of the bonnet. These two arms are curved, making the segment of a circle, such as would be described at their distance from the joint L *n* as a center.

A slit is made in the arm *t r*, and a bolt, *b l*, passes through this slit and the arm *s z*. As the runner turns in the joint L *n* the runner is raised or lowered, as is also the finger-bar F, and by means of the bolt *b l*, passing through the arms *s z* and *t r*, may be held as desired in reference to a slanting or horizontal position. The arm *s z* could be cast and made permanent with the runner and the part which compresses the finger-bar left off, in which case the finger-bar would be bolted to the runner. With this arrangement of the adjustable shoe or runner the finger-bar, cutter, and platform may be leveled and kept in a horizontal position, although they are elevated and depressed through the segment of a circle described from the axle of the driving-wheel as a center. They can also be set at any desired pitch or angle at the different heights it may be required to work the cutters. The finger-bar passes through this shoe and connects with a goose-neck runner at the outer corner of the frame, as hereinafter described. The slit in the arm *t r* is about five inches long. A slit is made in the runner part for the heel of the cutter-bar and cutters to work through, as represented at *g h*. The divider T, Fig. 1, is made sufficiently strong to support one end of the cross-bar *e*, which carries the caster-wheel *d*.

On the rear corner of the platform is a standard framed into the timbers of the platform and strengthened by a casting. This standard supports the other end of the cross-bar *e*, and is marked R. There are several bolt-holes through this standard, and also through the divider. The cross-bar is bolted to this standard and to the divider, and by means of the bolts and the several bolt-holes may be raised and lowered at pleasure. This cross-bar is on a line with the point of the divider. The socket in which the swivel of the caster-wheel works is bolted to this cross-bar, so that the cutter-bar, cutters, and platform may be raised and lowered by adjusting the cross-bar to the different bolt-holes in the standard and divider. The wheel is twelve inches in diameter, and made sufficiently strong to carry the platform, and the swivel and socket correspond thereto in strength and size. The wheel, swivel, and socket are combined in the usual manner. The inner dividing-board, B *b*, angles inward from the cross-bar, as does also the timber and end of the platform upon which it stands. This affords sufficient room for the wheel to turn to the right or left as much as may be required in harvesting grain.

The finger-bar F, Figs. 1 and 2, passes through the adjustable shoe E and connects with a goose-neck runner near the outer corner of the frame, as represented at *q*, Fig. 5. This runner is made rounding on the bottom, so that it will form a runner, whether the machine is progressing forward or turning at the corners. It is bolted to the end of the finger-bar and connects with the outside timber of the frame H *h*. A slit is made in the neck of this runner, through which a bolt passes to fasten it to the frame. This slit is represented at 4, Fig. 5, and in shape corresponds to the segment of a circle, such as the goose-neck describes when bolted to the finger-bar and moved by the adjustable shoe turning in its joint L *n*, Fig. 2. It slides on the ground when moving, and supports the end of the finger-bar and the corner of the frame. In reaping it will of course be elevated above the ground. The caster-wheel *d d* carries this part of the platform and frame.

The wheel, swivel, and socket are the same in size and proportions of the other caster-wheel. The wheel is attached to the end of the lever *y n* at a sufficient distance from the finger-bar to allow it to turn round without coming in contact with the finger-bar.

The lever *y n* is connected to a small casting on the frame by means of a bolt, and also to a standard rising from the finger-bar, (represented at *h g*, Fig. 1.) The standard *h g* is bolted to the finger-bar, and rises about eighteen inches, so that it may be bolted to the lever *y n*, at whatever height the finger-bar may be placed. Several bolt-holes should be made through this standard, so as to receive the bolt from the lever, at whatever height the finger-bar may be placed. With this arrangement the platform, finger-bar, and cutters can be carried at any desired height, as they are sustained and carried entirely by the arrangement of the two caster-wheels when reaping. These wheels should run as nearly opposite to each other as may be, as shown at $P'$ $P^2$. When mowing the platform and both wheels may be removed, so as to allow the finger-bar to slide on the ground.

A pin, $P^2$, holds the swivel in its socket. This pin can be removed from the wheel *d d* and the wheel taken out, leaving the lever *y n* in its place when mowing. The gearing and driving-shafts are supported upon the frame on the outside of the driving-wheel, in order more equally to balance the frame upon the axle of the driving-wheel.

The driving-shaft is represented at G H, Fig. 5, and the large bevel-wheel at H *a*, Fig. 1. Fig. 5 is a plan view of the frame. The front timber, *z n*, is represented as running across the frame; but when the guide-stirrup B B, Fig. 1, is put in this timber stops short and is bolted to the flange or short arm of the stirrup, as shown at *g*, Figs. 1 and 3. The timbers H *h* and H *y* and *o n* may be three by three and a half inches in size, the front timber, *z n*, three by five, and the side timber, H, three by five at the end where the adjustable shoe is bolted, and taper to three inches where it is bolted to the short arm of the guide-stirrup, as shown at *g* H, Fig. 3. The proportions herein given may be varied as circumstances require without affecting the principle of the improvements herein described.

The dividing-board B *b*, Fig. 1, being set upon an angle inward, and the bar *e* being on a line with the point of the divider, several inches of space exist between them, affording room for the caster-wheel to turn as much as required. This bar *e* also affords a support for a reel-post in such a position as to bring the reel-post out of the way, so that the cut grain will not lodge against it.

Fig. 6 shows a rear view of a portion of the platform, together with the relative position of the parts attached to its outer end.

Having described my combined grain and grass harvester, what I claim therein as new, and for which I desire to secure Letters Patent, is—

1. The manner of constructing and uniting the inner rear corner of the main frame so as to depress or drop the shoe and cutting apparatus and serve as a continuation of the shoe for treading down the stubble and mown grass, in the manner and for the purposes specified.

2. The combination of the guide-stirrup B B with the front of the main frame, so as to permit the draft-pole P to play above and below the front of the main frame, substantially as described.

3. Connecting the draft-pole to the machine by the oscillating pendant, substantially as and for the purposes described.

4. So connecting the draft-pole to the machine as that the draft shall be from the axle or center line of the driving and supporting wheel in connection with the rear extension of the pole, in the manner and for the purposes specified.

5. The combination of the extended finger-bar with the adjusting-shoe E and adjustable hinged runner *q*, substantially as described, for the purpose specified.

6. The combination of the main frame, draft-pole P, guide-stirrup B, and adjustable shoe E, arranged with each other in the manner and for the purpose substantially as specified.

7. The adjusting-shoe E, constructed and operating in the manner above set forth.

8. The arrangement of the caster-wheels *d* and *d d* with adjustable connecting-bars in relation to the finger-bar, platform, and frame of the machine in the manner and for the purpose substantially as described.

ELIAKIM B. FORBUSH.

Witnesses:
GEORGE WADSWORTH,
WALTER H. FORBUSH.